United States Patent [19]
Zippel, Sr.

[11] Patent Number: 5,857,881
[45] Date of Patent: Jan. 12, 1999

[54] AUTOMATICALLY INFLATING BLADDER AND LINE SEVERING MEANS FOR ROD AND REEL

[76] Inventor: David R. Zippel, Sr., 2720 Eagle St., Jacksonville, Fla. 32216

[21] Appl. No.: 2,317

[22] Filed: Jan. 2, 1998

Related U.S. Application Data

[63] Continuation-in-part of Ser. No. 604,495, Feb. 21, 1996, abandoned.

[51] Int. Cl.$^6$ ................................................ B63B 22/16
[52] U.S. Cl. ................................ 441/6; 43/25; 441/9
[58] Field of Search ............................ 43/25, 17.2, 18.1; 441/1, 8, 6, 7, 9, 10

[56] References Cited

U.S. PATENT DOCUMENTS 2,642,693  6/1953  Broady ........................................ 441/6
4,583,314  4/1986  Kirkland ...................................... 441/8

*Primary Examiner*—Ed L. Swinehart
*Attorney, Agent, or Firm*—Steven R. Scott

[57] ABSTRACT

An apparatus for connection to a rod and reel, comprised, in its preferred embodiment, of (1) an emergency flotation bladder, (2) a compact container in which said bladder is stowed, (3) connection means for connection of said container to the rod portion of a rod and reel, (4) monofilament line severing means for severing the line of the rod and reel to which the container is connected, and (5) means for automatically triggering monofilament line severing means and inflating said bladder when the article with attached container falls into water by some mishap or is otherwise immersed therein.

12 Claims, 3 Drawing Sheets

AUTOMATICALLY INFLATING BLADDER AND LINE SEVERING MEANS FOR ROD AND REEL

This application is a continuation-in-part of Ser. No. 08/604,495 filed on Feb. 21, 1996, by the same inventor, David R. Zippel, Sr., now abandoned.

BACKGROUND OF THE INVENTION

1. Field of the Invention

This invention pertains generally to the field of flotation devices, and more specifically to the field of flotation devices for the rescue/recovery of equipment washed overboard or otherwise lost in the water. More precisely, it is concerned with flotation devices for the recovery of a fisherman's rod and reel. In particular, it deals with a device for connection to a fishing rod and reel having an automatically inflating bladder with automatic means for severing the connection between the fishing line and the rod and reel.

2. Prior Art in the General Field of the Invention

Prior art in the general field of automatic flotation devices for the rescue/recovery of equipment washed overboard or otherwise lost in the water has focussed on the provision of small detachable buoys that are attached to the equipment to be recovered via light weight lines and, at least theoretically, provide a marker for the equipment's location and a means for drawing it back to the surface and out of the water-i.e.-for recovery of same. A typical example of same is found in U.S. Pat. No. 3,982,294, issued to Hicken in 1976 for a "Retriever." The Hicken patent describes a "retriever device" with connective means adapted for connection to the base of the handle of a rod and reel. It is comprised of a float which is connected by a spool of line to the connective means which, if functioning properly, detaches automatically upon immersion of the rod and reel and floats to the surface of the water, marking the position of the rod and reel and allowing its recovery. The float is attached to the connective means via a water soluble adhesive. Detachment is effected when this adhesive dissolves, allowing the float to seek the surface of the water. In its preferred embodiment, this device also utilizes a "gas generating tablet" positioned so as to generate gases (and internal pressure between the float and the connective means) upon contact with the water and to thereby assist in the separation of the float from the connective means.

Similar ideas are seen in the patents that follow. The "Spar Float Recovery Capsule" issued to Fish in 1978, and the patent for "Sportsman's Retriever" issued to McLennan et al. in 1981, both feature floats which serve as buoys. (In the Fish patent the float also serves as a spool for the attaching line). This buoy is housed in a case which is attachable to an item of equipment and is retained in this case (against the force of a compressed spring which would serve to eject it therefrom) via, once again, an adhesive which dissolves in the presence of water. Likewise, the patent issued to Fuller in 1987 (U.S. Pat. No. 4,713,031) for a "Submerged Bobber Release Device for Fishing Rods and the Like" focuses on a spring ejected buoy attached by line to an item of equipment. In the case of Fuller, however, the ejection is accomplished not via the dissolution of a water soluble adhesive, but when an aspirin tablet or other water soluble object blocking release dissolves in the presence of water. Another prior art device is described in U.S. Pat. No. 5,126,562, issued to Pearson et al. for a "Submerged Article Marker and Retriever" in 1992. The Pearson device is, once again, similar in overall nature to those that preceded it. In this case, however, the float used (which like the float in Fish, supra, also serves as the spool) is not forcibly discharged via a spring, but is released when the case holding it falls into two pieces upon the dissolving of (predictably) a "water soluble adhesive." Further examples of art which may have some relevance to the general field of the invention may be seen in U.S. Pat. Nos. 2,979,740 issued to Walker in 1957; 3,127,624 issued to Kubit in 1964; 3,682,354 issued to Witte in 1972; and 5,419,725 issued to Crowder in 1995.

All of these devices have problems when utilized in the context preferred for the instant device-i.e.-the recovery of fishing rods and reels lost overboard. These problems appear to arise from several factors. To begin with, most are intended to be extremely compact in configuration so as to be unobtrusive and not to interfere with the convenient operation of the equipment in question. Thus, they often are not intended to provide a flotation means for maintaining the position of the equipment itself on the surface of the water. Indeed, most (in keeping with their goals of extreme compactness) rely on small "floats" that do not displace enough water to create the buoyancy necessary to carry much more than their own weight (and a connecting line) to the surface. These are likewise limited by the amount of line they can carry. Thus, an object lost in water that is deeper than the line provided is lost for good. (This limitation is specifically noted in the Fish patent). Most do not provide compact devices adapted for connection to equipment that are both extremely compact in configuration and can provide (at need) the flotation necessary to maintain a relatively heavy object at the surface of the water. Moreover, even those that are purported to provide such an apparatus lack an important feature characteristic of the preferred embodiments of the instant invention—means for terminating the connection between the fishing line and the rod and reel. This is an important deficit as: (a) the tackle on the line is generally far less expensive than the rod and reel while being disproportionately heavy in comparison thereto (making flotation for the combination of rod, reel and tackle difficult); and (b) the rod and reel of a fisherman is often lost due to the activity of a fish on the line or because the tackle has been caught on a submerged object while trolling. Thus, it is extremely advantageous to terminate the connection between the line and the rod and reel as well as providing flotation means for the rod and reel. This is particularly true when it is remembered that the fish or submerged object may be able to overcome the buoyancy of the flotation means provided and (in the case of the fish) tow the rod and reel to a different location.

SUMMARY AND OBJECTS OF THE INVENTION

It is the primary object of this invention to satisfy the need for an emergency flotation device for a fisherman's rod and reel that is compact, rugged and relatively simple. This object is accomplished by the provision of (i) an automatically inflating emergency flotation bladder for equipment that is stored in a compact case that may be attached to a rod and reel with (ii) automatic means for severing the fishing line connected to such rod and reel. In the preferred embodiment of this invention, the invention is comprised of: (1) an emergency flotation bladder; (2) a compact container adapted to be connected to a rod and reel in which said bladder is stowed; (3) inflation means for the bladder contained within said compact container; (4) line severing means connected to said compact container; and (5) means for automatically triggering said line severing means and inflation means such that the fishing line of a rod and reel is severed and said bladder is inflated when the rod and reel with attached container falls into water by some mishap or is otherwise immersed therein. It is a further object of this invention to provide automatic emergency flotation means for other equipment and for small children or others who might happen by some accident to fall into water. Finally, it is an object of this invention to provide an alternative embodiment of the above described device that is manually triggered. The compact container forming the body of this invention may also be easily and non-restrictively carried on or about the person while in or near the water and can serve to provide a buoy/flotation device for emergency usage if a swimmer or other user is in trouble in the water.

BRIEF DESCRIPTION OF THE DRAWING FIGURES

FIG. 1 provides a perspective view of a first preferred embodiment of this invention.

FIG. 2 provides a cross-sectional view of the first preferred embodiment of this invention illustrated in FIG. 1.

FIG. 3 provides an exploded view of the components comprising the automatic inflation means of the first preferred embodiment of this invention.

DETAILED DESCRIPTION OF THE PREFERRED EMBODIMENTS

Figure 1:
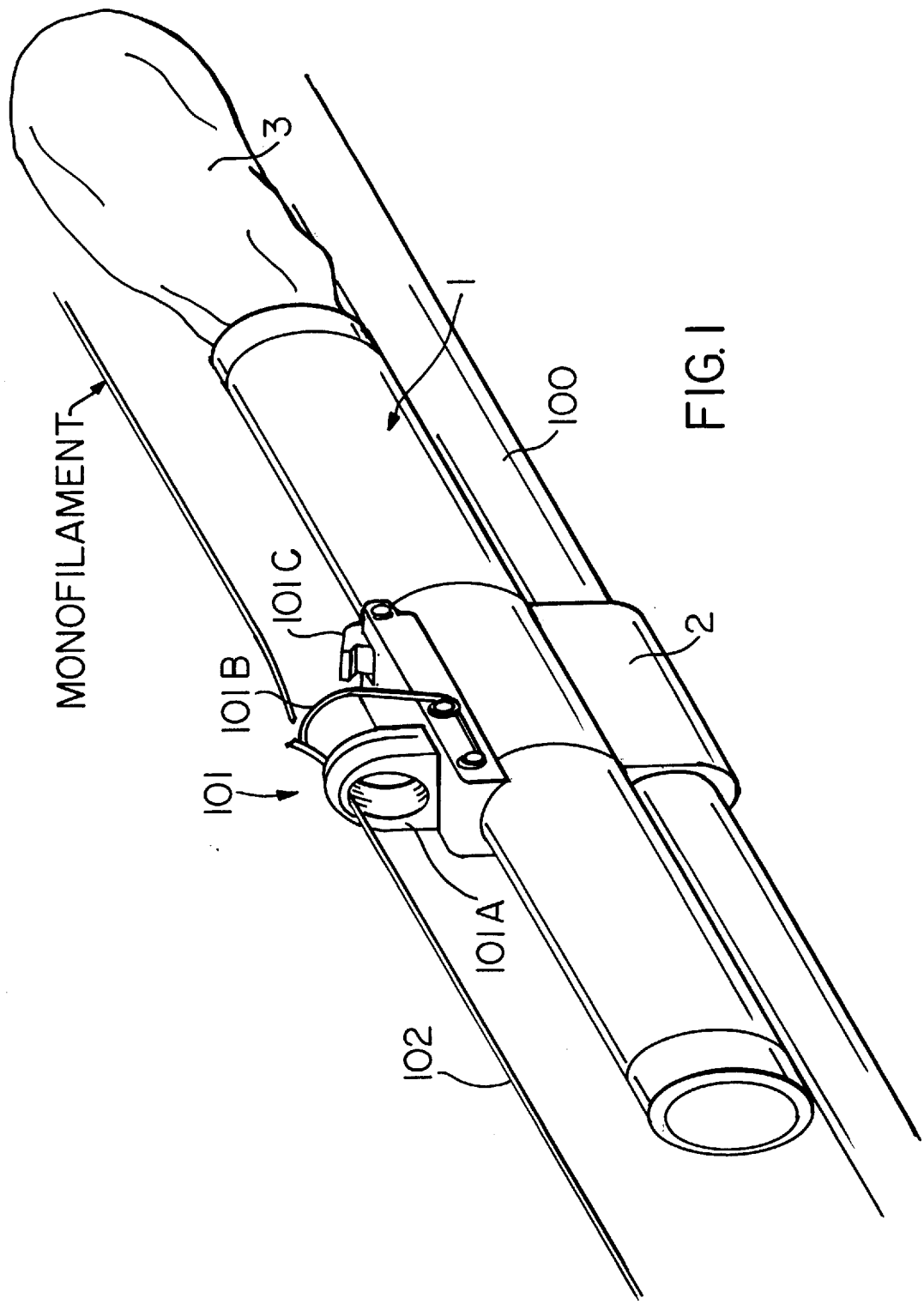

FIG. 1 provides a perspective view of the preferred embodiment of this invention. As will be noted, the invention is characterized in this embodiment by a compact external case 1 (generally denominated as such by arrow "1") and mounting means 2 for connecting same to the rod 100 of a rod and reel. The mounting means 2 may take the form of a bracket with strap or any other form known in the art for mounting the case 1 to a rod and reel. On the opposite side of case 1 from mounting means 2 is a monofilament line severing means (denoted generally by arrow 101) for severing a monofilament line 102. The monofilament line severing means 101 includes a line holding means 101a and a spring biased cutting means 101b. Latch 101c restrains cutting means 101b until withdrawn, at which point cutting means 101b is released and snaps against holding means 101a in the manner of an activated mouse trap. If desired, holding means 101a and/or cutting means 101b may be provided with sharpened, blade type surfaces in order to expedite the cutting of monofilament line 102; however, the need for this is minimal as monofilament line (when taut) is easily severed.

Figure 2:
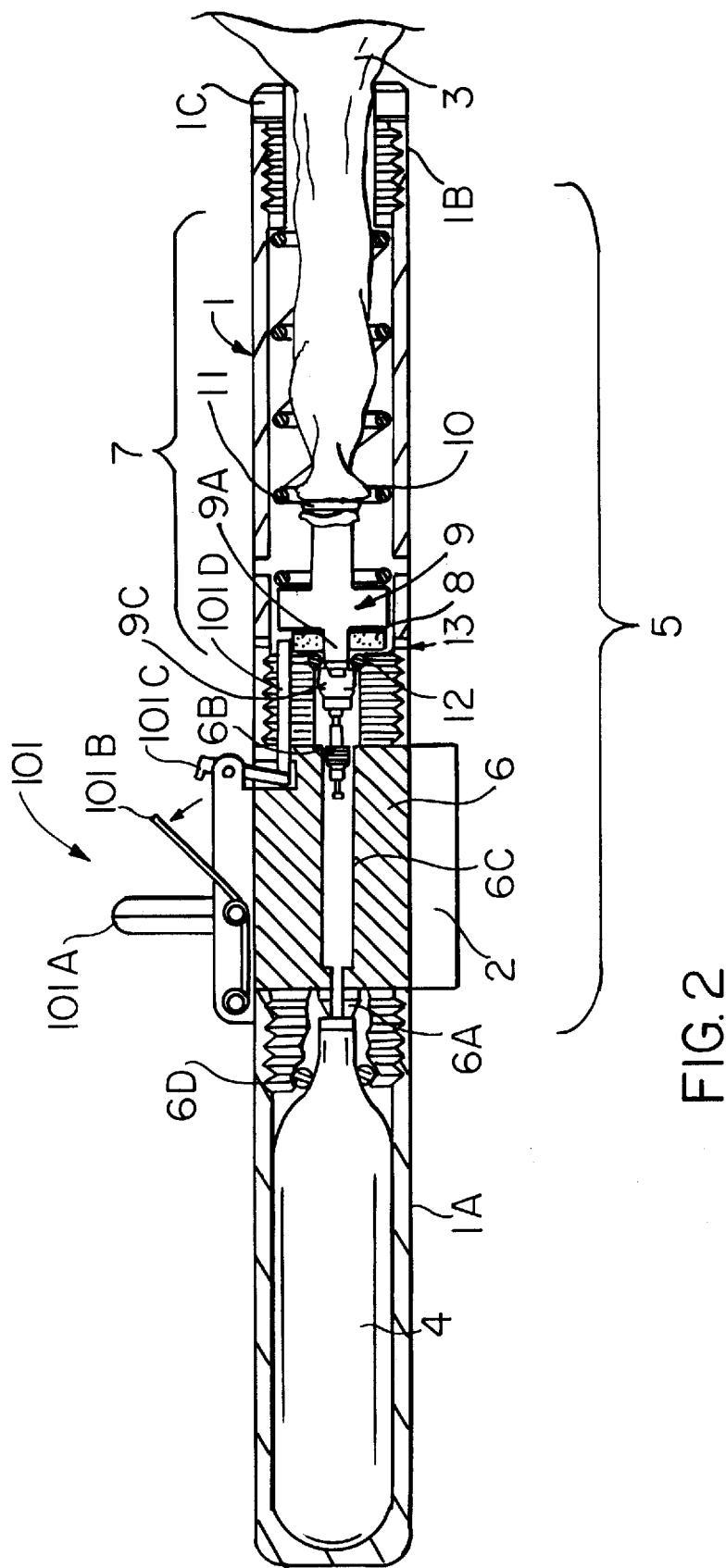
Figure 3:
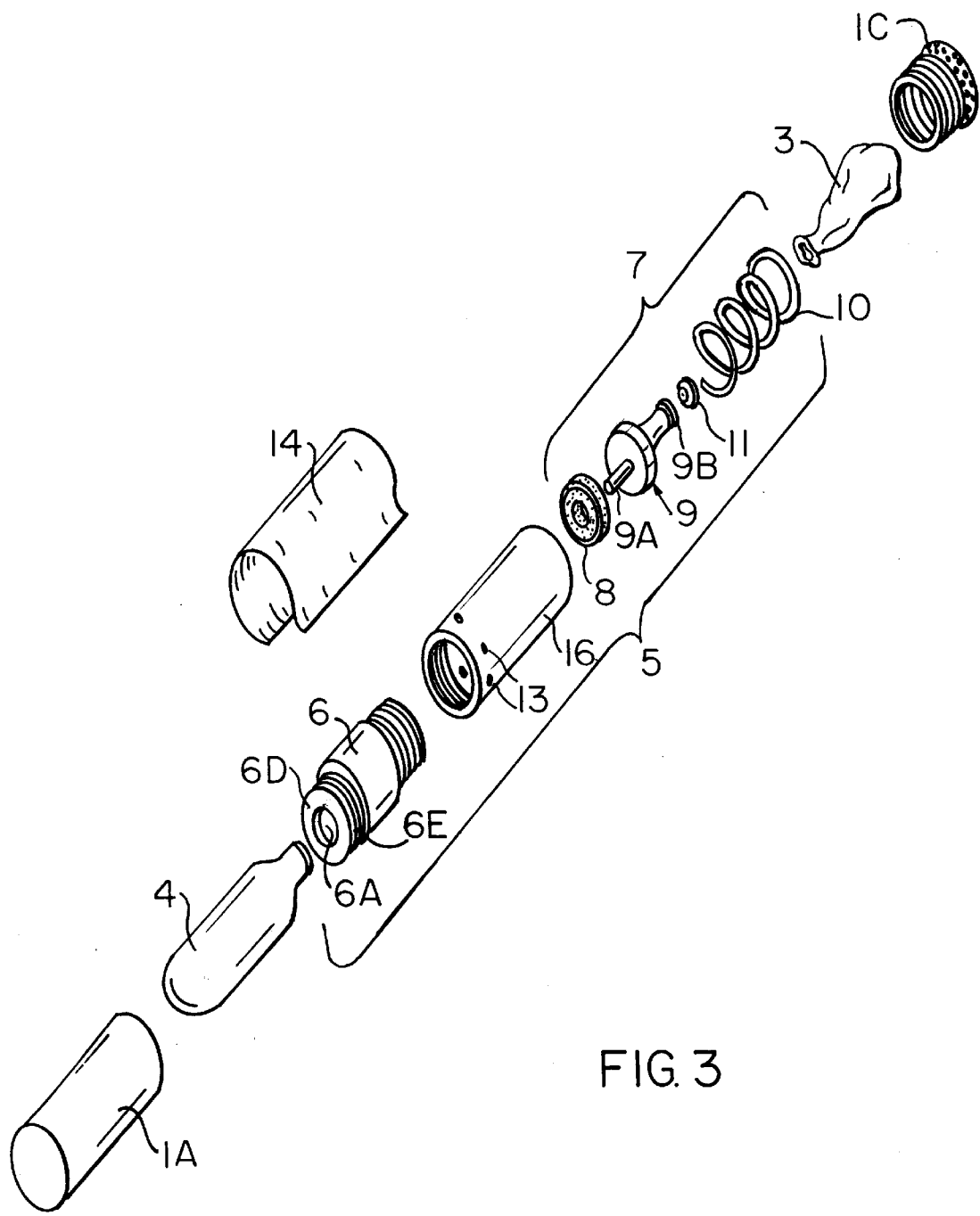

The internal features of the device, including the means by which the aforesaid line cutting mechanisms are activated, are most easily appreciated by review of FIGS. 2 and 3, which provide, respectively, a cross-sectional view and an exploded view of the automatic inflation means of the embodiment illustrated in FIG. 1. As will be noted, the primary internal components of the case 1 are the bladder 3, the inflation means 4 for same, and control means 5 (indicated generally as being comprised of those sub-elements included within the brace "5" in FIGS. 2 and 3) for automatically triggering said inflation means 4 and inflating said bladder 3 when the article with attached case 1 is immersed in water.

Inflation means 4 is shown in the drawing figures as, and may advantageously be provided by, what is commonly known and referred to as a "$CO_2$ Cartridge" of the type utilized for "BB" guns and for other uses and contains compressed Carbon Dioxide. The compressed gas contained within cartridges of this type is accessed/released by puncturing a thin diaphragm in the tip of the cartridge. Bladder 3 is shown in the drawing figures as, and may advantageously be provided by, a balloon (which is uninflated and maintained within case 1 until the device is triggered). This balloon may be of the lightweight variety commonly available for parties and other uses, but should preferably be formed from a more durable and/or heavier gauge material. For the uses envisioned for this device, the highly reflective balloons formed from Mylar® film are particularly advantageous due to their durability and reflectivity, which allows them to be visible for long distances.

Control means 5 is provided in the embodiment illustrated in FIGS. 1 through 3 through a variety of interacting subcomponents, including some that function both as parts of the case 1 and as subcomponents of the control means 5. First, to help effect the release of gas from the cartridge forming inflation means 4 (by assisting in the piercing of the diaphragm at the tip thereof) and to help control the escape of gas therefrom, there is provided a first cylinder 1a which encloses the inflation means 4. Second, there is provided a valve body 6 which is connected via the provision of intermeshing screw threading in each to first cylinder 1a (as explained in more detail below). Valve body 6 has numerous subcomponents, including a piercing tip 6a and a valve 6b connected by a hollow tubular connector 6c as well as other features described below. Third, to release gas from the valve body 6 into the bladder 3 via valve 6b when the device is immersed, there is provided a triggering mechanism 7 (indicated generally as being comprised of those subelements included within the brace "7" in FIGS. 2 and 3) and a second cylinder 1b which encloses the bladder 3 and the other components of the triggering mechanism 7. As will be obvious upon review of the drawing figures, triggering mechanism 7 also includes numerous subcomponents, as described below.

First cylinder 1a and valve body 6 may be (and are intended to be) connected, as will be clear upon review of FIGS. 2 and 3, by screwing same together utilizing the cylinder threads of first cylinder 1a and the first threaded portion 6e of valve body 6. As these components (first cylinder 1a and valve body 6) are screwed 5 together, the cartridge forming the inflation means 4 (which is snugly nestled in first cylinder 1a during this process) is brought into engagement with piercing tip 6a, which penetrates the diaphragm of the cartridge forming inflation means 4, allowing compressed gas to enter the hollow tubular connector 6c. Compression is preserved within the tubular connector 6c via: (1) "O" ring 6d, which is brought into sealing engagement with the $CO_2$ cartridge forming inflation means 4 as first cylinder 1a and valve body 6 are screwed together and prevents the escape of gas from the end of the valve body 6 proximate inflation means 4; and (2) valve 6b (a schrader valve), which prevents the escape of gas from the end of the valve body 6 distant from the cartridge forming inflation means 4 unless and until its stem is compressed.

The primary components of the triggering Mechanism 7 are: (1) a water soluble brace 8; (2) a thrusting member (indicated generally by arrow "9"); and (3) a spring 10. As will be observed, the thrusting member 9 is hollow and has an extension 9a which may serve to compress the valve 6b via plunger 9c, allowing gasses to pass therethrough and enter the bladder 3. The thrusting member 9 is forced by spring 10 in the direction of schrader valve 6b (so as to depress the stem of valve 6b via plunger 9c and allow the escape of compressed gas therefrom), but is blocked and prevented from doing so by brace 8. The thrusting member 9 likewise serves to disengage latch 101c via activation pin 101d, allowing spring biased cutting means 101b to snap shut and sever monofilament line 102. Spring 10 must, therefore, be of sufficient strength to press thrusting member 9 in the direction of inflation means 4 so as to (i) press thrusting member extension 9a and plunger 9c firmly against, and open, valve 6b, and (ii) cause activation pin 101d to disengage latch 101c, but (iii) not be of sufficient strength to crush or compress brace 8. Brace 8 may be formed from a variety of water soluble solid materials possessing sufficient anticompressive properties to counteract the pressure exerted by spring 10 when dry. Products in common usage that may be used for this purpose include aspirin tablets and $CO_2$ releasing tablets. In the embodiment illustrated the latter option is chosen, the brace 8 being formed from the common commercial pharmaceutical preparation known as Alka-Seltzer®, with a central hole bored therethrough to allow thrusting member extension 9a to pass through its center.

Several subsidiary components are included within the category of components comprising triggering mechanism 7. These components assist in the function of the three primary elements indicated above. For example, lip 9b of the thrusting member 9 is adapted to receive the orifice of bladder 3. This is accomplished by stretching the rubber ring surrounding the orifice of bladder 3 around and over lip 9b where its own elasticity holds it snugly in position. However, to help assure that it does not escape upon inflation, there is provided a bladder "O" ring 11, which helps to secure the bladder 3 over the lip 9b of thrusting member 9. In addition, there is provided a plunger "O" ring 12, which helps to assure that gas released from schrader valve 6b does not escape, but is directed through the thrusting member 9 to the bladder 3. Further, water inlet holes 13 located in second cylinder 1b adjacent to the location of brace 8 have been provided to allow water exterior to second cylinder 1b to enter same and contact brace 8. These water inlet holes are, however, generally blocked by a wrapper 14, which is wrapped around the case 1 so as to cover water inlet holes 13. Wrapper 14 is formed from water resistant materials and secured with water soluble adhesive so as to block casual activation of the device by the contact of brace 8 with water through a chance splashing of same (or cumulative exposure to humidity) via inlet holes 13. When the device is totally immersed, the aforesaid adhesive holding the wrapper 14 in place dissolves, allowing water to contact the brace 8 via inlet holes 13. It is also advantageous to provide a locking pin transverse to and penetrating casing 1 in the vicinity of thrusting member 9 which can serve to block the movement of thrusting member 9 until removed. Finally, there is provided a threaded bushing cap 1c to compress the spring 10, holding the components of the triggering mechanism 7 in snug engagement with the brace 8 and the components of the valve body 6.

The nature of the inventive concept disclosed herein, which is subject to numerous other and additional variations with exceeding the spirit and scope thereof, may be more fully determined by a An alternative embodiment is illustrated in FIGS. 4, 5 and 6. This embodiment is manually activated, and features a compress and twist activation mechanism of the type well known in the mechanical arts. This embodiment may be activated (in the manner also well known in the mechanical arts), by moving first cylinder 1a and second cylinder 1b together (compressing spring 10) and twisting first cylinder 1a in the direction shown by arrows "a" while simultaneously twisting second cylinder 1b in the direction shown by arrows "b." As will be noted, this embodiment includes many of the same components described above (which are similarly denominated); however, the manually actuated compress and twist mechanism illustrated has been substituted for the automatically activated features characterizing the embodiment previously described. It also includes convenient attachment means 15 for the convenience of the user.

FIGS. 7, 8, 9, and 10 illustrate the use of the instant invention as an attachment in various contexts. As an attachment to heavy equipment, FIG. 7 illustrates the use of the automatically inflating embodiment described herein. A rod and reel is similarly protected in FIG. 8. In this figure, three possible means for attaching the case 1 of the invention to the rod and reel is shown: (1) As an insert in the handle of the rod; (2) as a free hanging attachment susceptible to attachment at various locations via attachment means 15; and (3) as a compact attachment positioned parallel to and snugly affixed to the rod. This embodiment is also illustrated as a possible attachment (via an appropriate harness) to help protect a baby or small child from drowning in FIG. 9. Finally, the manually actuated version of same is illustrated in FIGS. 10 and 11 as a handy and compact emergency device to be taken by swimmers and which may serve to help protect them in emergency situations.

I claim:

1. An apparatus for connection to a rod and reel, comprising:
    a) an activatable monofilament line severing means; and
    b) means for automatically activating said activatable monofilament line severing means upon submergence of the apparatus in water.

2. An apparatus for connection to a rod and reel, comprising:
    a) an activatable monofilament line severing means;
    b) means for automatically activating said activatable monofilament line severing means upon submergence of the apparatus in water;
    c) an inflatable flotation bladder of sufficient buoyancy, when inflated, to maintain an object attached thereto at or near the surface of the water; and
    d) means for automatically inflating said inflatable flotation bladder upon submergence of the apparatus in water.

3. An apparatus for connection to a rod and reel, as set forth in claim 1, further comprising a compact case for housing certain elements of said apparatus.

4. An apparatus for connection to a rod and reel, as set forth in claim 2, further comprising a compact case for housing certain elements of said apparatus.

5. An apparatus for connection to a rod and reel, as set forth in claim 1, further comprising means for attachment of said apparatus to a rod and reel.

6. An apparatus for connection to a rod and reel, as set forth in claim 2, further comprising means for attachment of said apparatus to a rod and reel.

7. An apparatus for connection to a rod and reel, as set forth in claim 2, wherein the means for automatically inflating said inflatable bladder includes a tank of compressed gas.

8. An apparatus for connection to a rod and reel, as set forth in claim 4, wherein the means for automatically inflating said inflatable bladder includes a tank of compressed gas.

9. An apparatus for connection to a rod and reel, as set forth in claim 6, wherein the means for automatically inflating said inflatable bladder includes a tank of compressed gas.

10. An apparatus for connection to a rod and reel, as set forth in claim 1, wherein the means for automatically activating said activatable monofilament line severing means upon submergence of the apparatus in water includes biasing means which serve to activate said activatable monofilament line severing means, and water soluble restraining means which serves to prevent activation of said activatable monofilament line severing means until said water soluble restraining means has dissolved in the presence of water.

11. An apparatus for connection to a rod and reel, as set forth in claim 2, wherein the means for automatically activating said activatable monofilament line severing means upon submergence of the apparatus in water includes biasing means which serve to activate said activatable monofilament line severing means, and water soluble restraining means which serves to prevent activation of said activatable monofilament line severing means until said water soluble restraining means has dissolved in the presence of water.

12. An apparatus for connection to a rod and reel, as set forth in claim 2, wherein the means for automatically inflating said inflatable flotation bladder upon submergence of the apparatus in water includes biasing means which serve in the activation of said means for automatically inflating said inflatable flotation bladder upon submergence of the apparatus in water, and water soluble restraining means which serves to prevent activation of said means for automatically inflating said inflatable flotation bladder until said water soluble restraining means has dissolved in the presence of water.

* * * * *